United States Patent
Eigenheer (10) Patent No.: US 10,351,041 B2
(45) Date of Patent: Jul. 16, 2019

(54) BOAT LOADING GUIDING SYSTEM

(71) Applicant: Jeffrey Allen Eigenheer, Hudson, WI (US)

(72) Inventor: Jeffrey Allen Eigenheer, Hudson, WI (US)

(*) Notice: Subject to any disclaimer, the term of this patent is extended or adjusted under 35 U.S.C. 154(b) by 0 days.

(21) Appl. No.: 15/913,578

(22) Filed: Mar. 6, 2018

(65) Prior Publication Data

US 2018/0194263 A1 Jul. 12, 2018

Related U.S. Application Data

(63) Continuation-in-part of application No. 14/859,297, filed on Sep. 19, 2015, now abandoned.

(51) Int. Cl.
*B60P 3/10* (2006.01)

(52) U.S. Cl.
CPC ........... *B60P 3/1066* (2013.01); *B60P 3/1075* (2013.01)

(58) Field of Classification Search
CPC ......... B60P 3/10; B60P 3/1033; B60P 3/1066; B60P 3/1075
See application file for complete search history.

(56) References Cited

U.S. PATENT DOCUMENTS

| | | |
|---|---|---|
| 3,021,969 A | 2/1962 | Peake |
| 3,057,493 A | 10/1962 | Cameron |
| 3,173,558 A | 3/1965 | Futch |
| 3,403,798 A | 10/1968 | Flatchbarth |
| 3,512,667 A | 5/1970 | Calkins |
| 3,603,465 A | 9/1971 | King |
| 3,608,754 A | 9/1971 | Park |
| 3,717,268 A | 2/1973 | Snodgrass |
| 3,887,093 A | 6/1975 | Howell |
| 3,888,367 A | 6/1975 | Cox |
| 3,961,983 A | 6/1976 | Crandall |
| 3,974,924 A | 8/1976 | Ullman, Jr. |
| 4,010,962 A | 3/1977 | Groblebe |
| 4,094,527 A * | 6/1978 | Miller ............ B60P 3/1033 280/414.1 |
| 4,099,279 A * | 7/1978 | Park ............... B60P 3/1075 114/344 |
| 4,103,926 A | 8/1978 | Johnston |
| 4,620,716 A | 11/1986 | Carbone |
| 4,664,401 A * | 5/1987 | Carrick ........... B60P 3/1033 114/344 |
| 4,684,145 A | 8/1987 | Tingley |

(Continued)

*Primary Examiner* — Joseph M Rocca
*Assistant Examiner* — Maurice L Williams (57) ABSTRACT

A boat loading guiding system includes a trailer including a frame having a front end, a rear end, and a longitudinal axis extending through the front and rear ends. A mount is attached to the frame and is aligned with the longitudinal axis. A horizontally orientated axle is attached to the mount and is orientated perpendicular to the longitudinal axis. The axle extends through each of a pair of arms adjacent to their first ends. The arms extend toward the front end and are pivotable to form an angle with respect to a top side of the primary support between 85° and 5°. A guide roller, for engaging a keel, extends between and is rotatably coupled to the arms adjacent to their second ends. A biasing member biases the second end of the arms upwardly above the top side of the primary support and toward a deployed position.

8 Claims, 5 Drawing Sheets

(56) References Cited

U.S. PATENT DOCUMENTS

| | | | |
|---|---|---|---|
| 4,900,216 A * | 2/1990 | Godbersen | B60P 3/1066 193/35 R |
| 4,955,778 A | 9/1990 | Godbersen | |
| 4,986,571 A | 1/1991 | Godbersen | |
| 4,997,332 A | 3/1991 | Johnson | |
| 5,066,033 A | 11/1991 | Kolstad | |
| 5,133,571 A | 7/1992 | Urbank | |
| 5,152,657 A | 10/1992 | Kehne | |
| 5,154,564 A | 10/1992 | Koch | |
| 5,228,713 A * | 7/1993 | Kovach | B60P 3/1033 280/414.1 |
| 5,255,933 A | 10/1993 | Carrick | |
| 5,273,391 A | 12/1993 | White | |
| 5,299,903 A | 4/1994 | Kesselring | |
| 5,316,329 A * | 5/1994 | MacKarvich | B60P 3/1066 193/35 SS |
| 5,417,447 A | 5/1995 | Godbersen | |
| 6,099,014 A * | 8/2000 | McLaughlin | B60P 3/1066 280/414.1 |
| 6,345,943 B1 | 2/2002 | Lawson | |
| 6,598,896 B1 | 7/2003 | Hyslop | |
| 6,637,549 B1 | 10/2003 | Lopacki | |
| 2003/0189836 A1 | 10/2003 | Sparling et al. | |
| 2006/0181056 A1 | 8/2006 | Weekes | |

\* cited by examiner

BOAT LOADING GUIDING SYSTEM

CROSS-REFERENCE TO RELATED APPLICATIONS

I hereby claim the benefit under 35 U.S.C. Section 119(e) of U.S. Provisional application Ser. No. 14/859,297 filed on Sep. 19, 2015.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to trailer mounted boat guide devices and more particularly pertains to a new trailer mounted boat guide device for assisting a person in guiding their boat while they are loading the boat onto a trailer.

BRIEF SUMMARY OF THE INVENTION

An embodiment of the disclosure meets the needs presented above by generally comprising a trailer including a frame having a first member laterally offset relative to a longitudinal centerline of the trailer, a second member laterally offset relative to a longitudinal centerline of the trailer, a front end, a rear end, and a plurality of supports extending between the first and second members. The trailer has a longitudinal axis extending through the front and rear ends. A first wheel is rotatably attached to the frame adjacent to the first member and a second wheel is rotatably attached to the frame adjacent to the second member. A trailer hitch is attached to the front end. A mount is attached to a primary support of the plurality of supports and is aligned with the longitudinal axis. An axle is attached to the mount. The axle is horizontally orientated and is orientated perpendicular to the longitudinal axis. A pair of arms each has a first end and a second end. The axle extends through each of the arms adjacent to the first ends. With respect to the trailer, the arms only extend forwardly from the first ends to the second ends. The arms are pivotable to form an angle with respect to a top side of the primary support between 85° and 5°. The arms remain above a bottom side of side primary support when the arms are in an engaged position abutting a keel of a boat. A guide roller extends between and is rotatably coupled to the arms adjacent to the second ends. The guide roller has a rotational axis orientated perpendicular to the longitudinal axis. A biasing member engages the mount and the arms. The biasing member biases the second end of the arms upwardly above the top side of the primary support and toward a deployed position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 5 thereof, a new trailer mounted boat guide device embodying the principles and concepts of an embodiment of the disclosure and generally designated by the reference numeral 10 will be described.

As best illustrated in FIGS. 1 through 5, the boat loading guiding system 10 generally comprises a trailer 12 including a frame 14 that has a first member 16 laterally offset relative to a longitudinal centerline of the trailer, a second member 18 laterally offset relative to a longitudinal centerline of the trailer, a front end 20, a rear end 22 and a plurality of supports 24 extending between the first 16 and second 18 members. The trailer 12 has a longitudinal axis extending through the front 20 and rear 22 ends. A first wheel 26 is rotatably attached to the frame 14 adjacent to the first member 16 and a second wheel 28 is rotatably attached to the frame 14 adjacent to the second member 18. It should be understood that additional wheels may be utilized such that each of the first 16 and second 18 members includes two or more wheels. A trailer hitch 30 is attached to the front end 20 and may comprise any conventional hitch assembly used for attaching a trailer to vehicle.

A first fixed keel roller 32 and a second fixed keel roller 33 are each rotatably coupled to the trailer 12 and are aligned with the longitudinal axis. The term "fixed" herein is defined to mean that the first 32 and second 33 fixed keel rollers are fixed in location relative to the frame 14 and only rotate within place. Each of the first 32 and second 33 fixed keel rollers has an axis of rotation orientated perpendicular to the longitudinal axis. The first fixed keel roller 32 is positioned rearward of the first 26 and second 28 wheels and the second fixed roller 33 is positioned forward of the first 26 and second 28 wheels.

A mount 34 is attached to a primary support 36 of the plurality of the supports 24 and is aligned with the longitudinal axis. The mount 34 includes a pair of vertical walls 38 that are laterally displaced from each other. The mount 34 will typically be positioned forward of the first 26 and second 28 wheels as well as positioned forward of the first 32 and second 33 fixed keel rollers. An axle 40 is attached to the mount 34. The axle 40 is horizontally orientated and furthermore is orientated perpendicular to the longitudinal axis. The axle 40 extends through the vertical walls 38.

Figure 1:
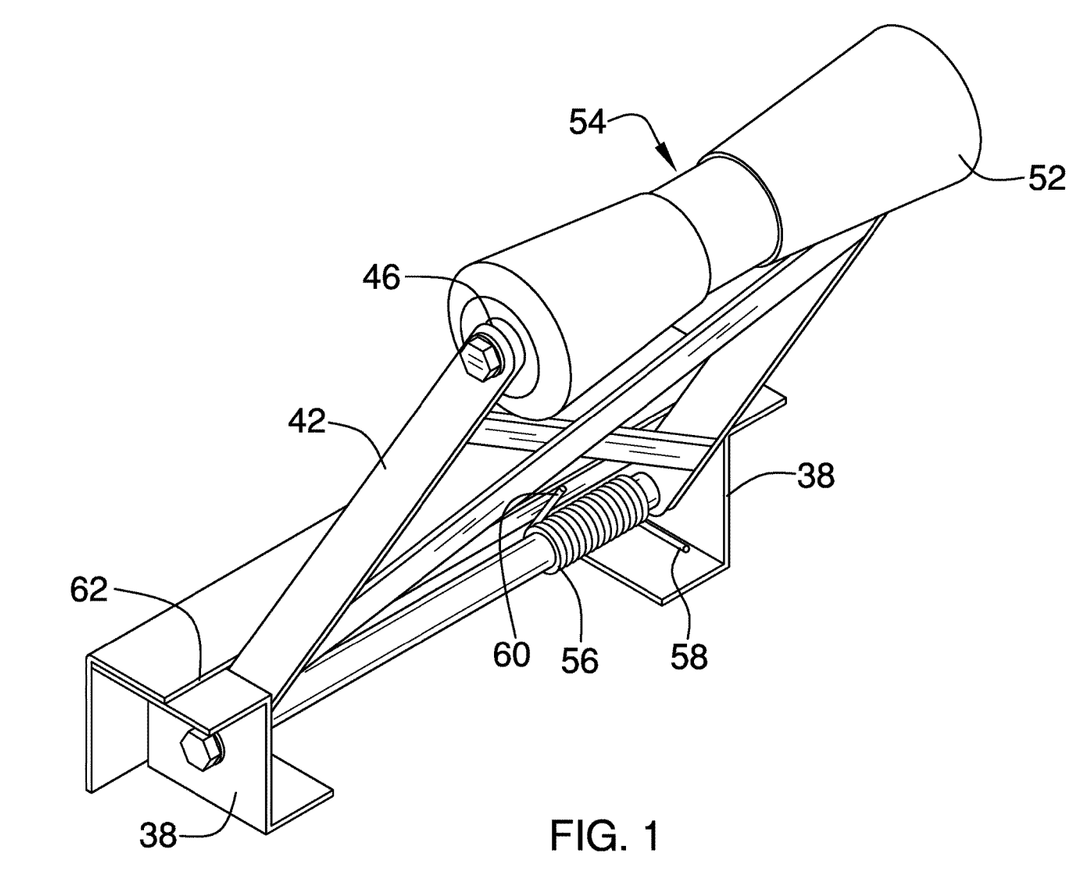
FIG. 1 is a front isometric view of a boat loading guiding system according to an embodiment of the disclosure.
Figure 2:
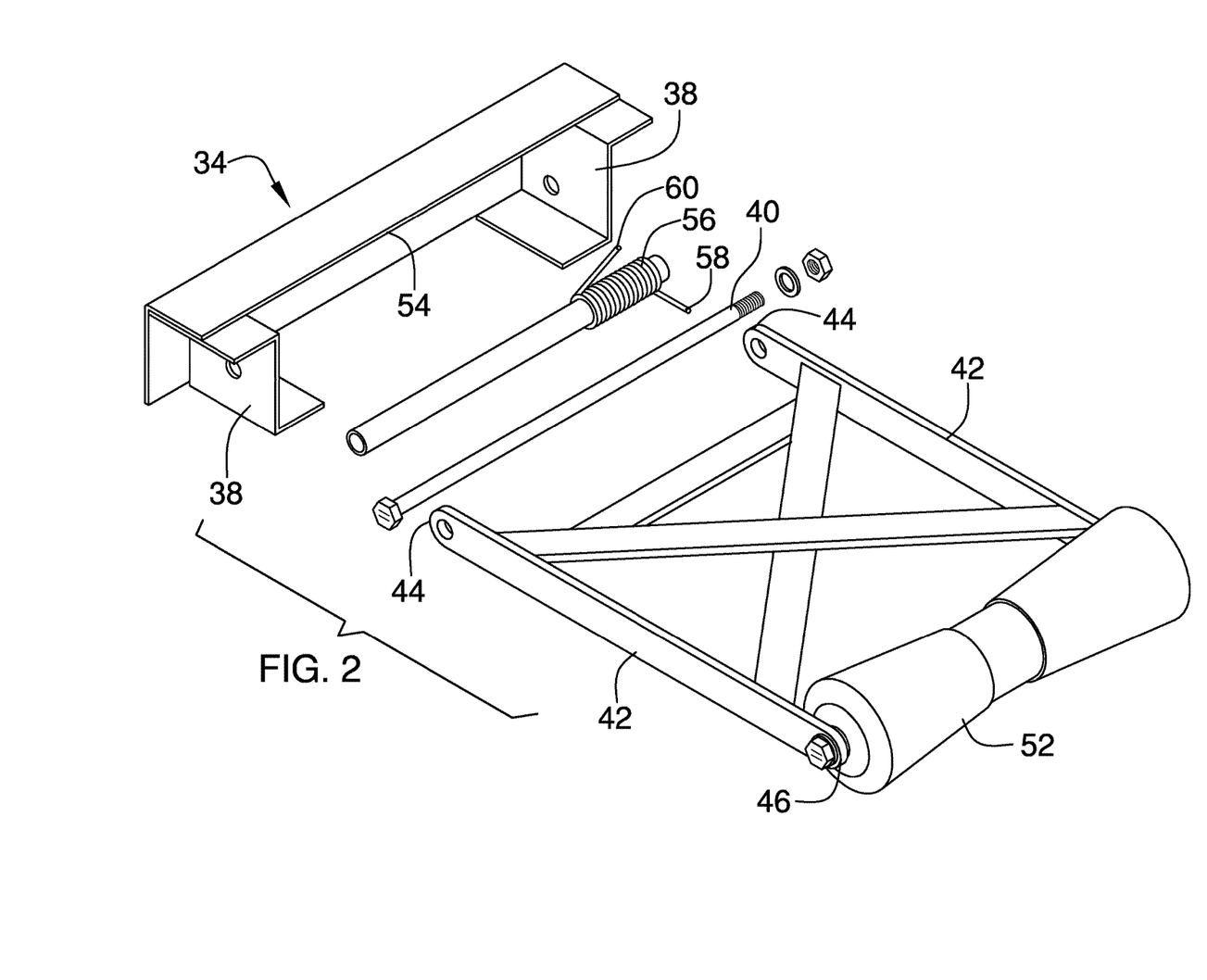
FIG. 2 is a front exploded isometric view of an embodiment of the disclosure.
Figure 3:
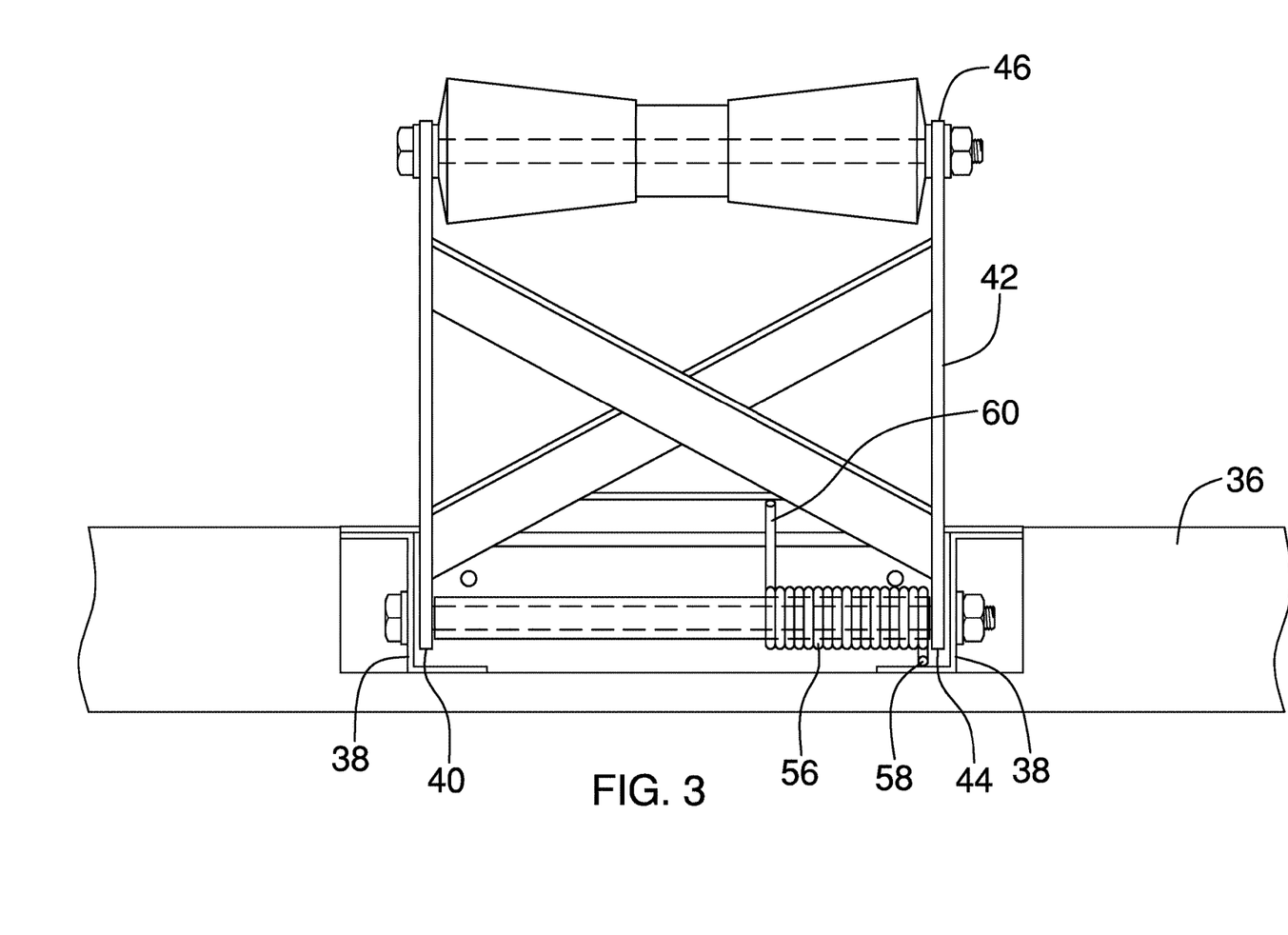
FIG. 3 is a front view of an embodiment of the disclosure.
Figure 4:
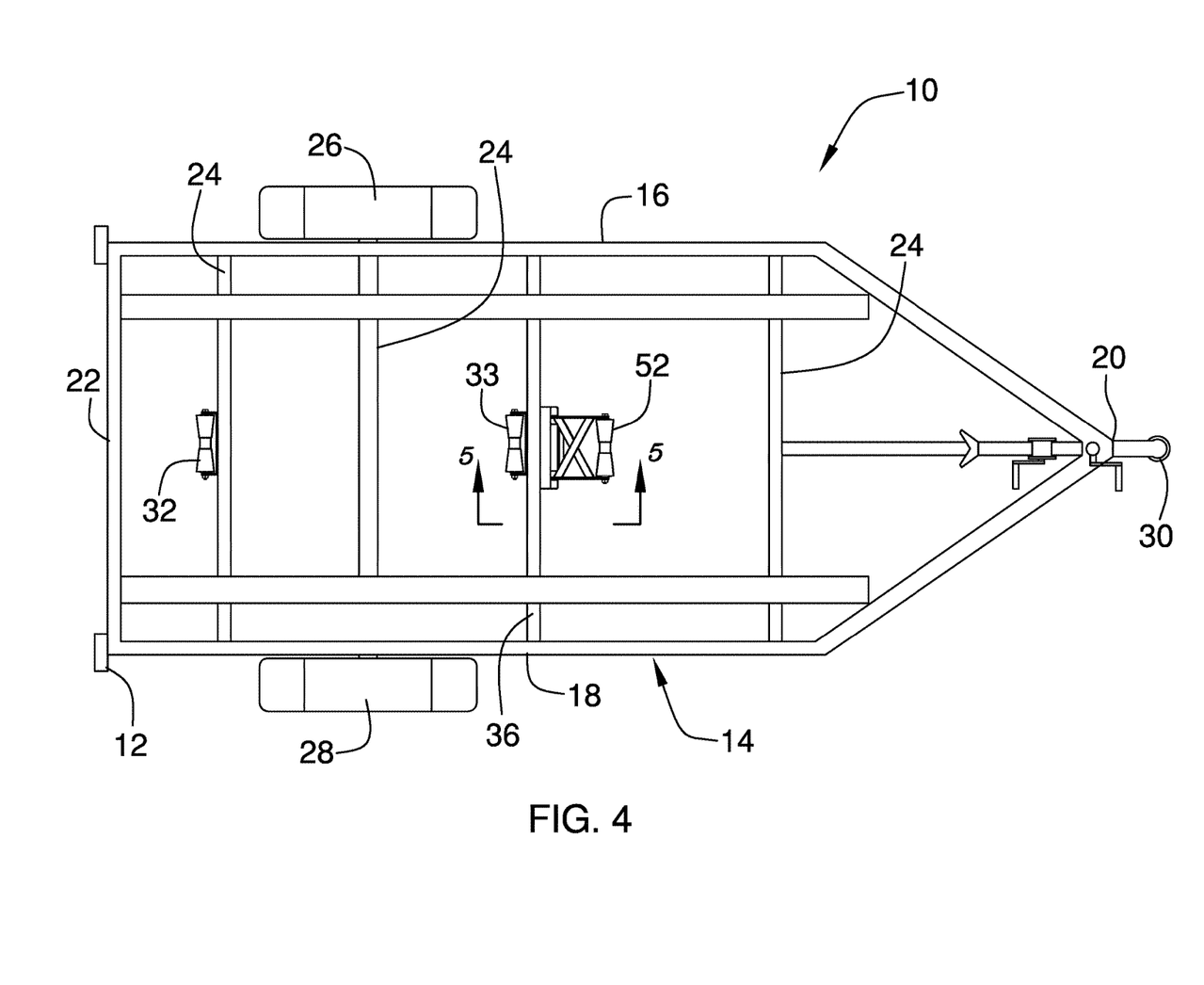
FIG. 4 is a side cross-sectional view of an embodiment of the disclosure taken along line 4-4 of FIG. 5.
Figure 5:
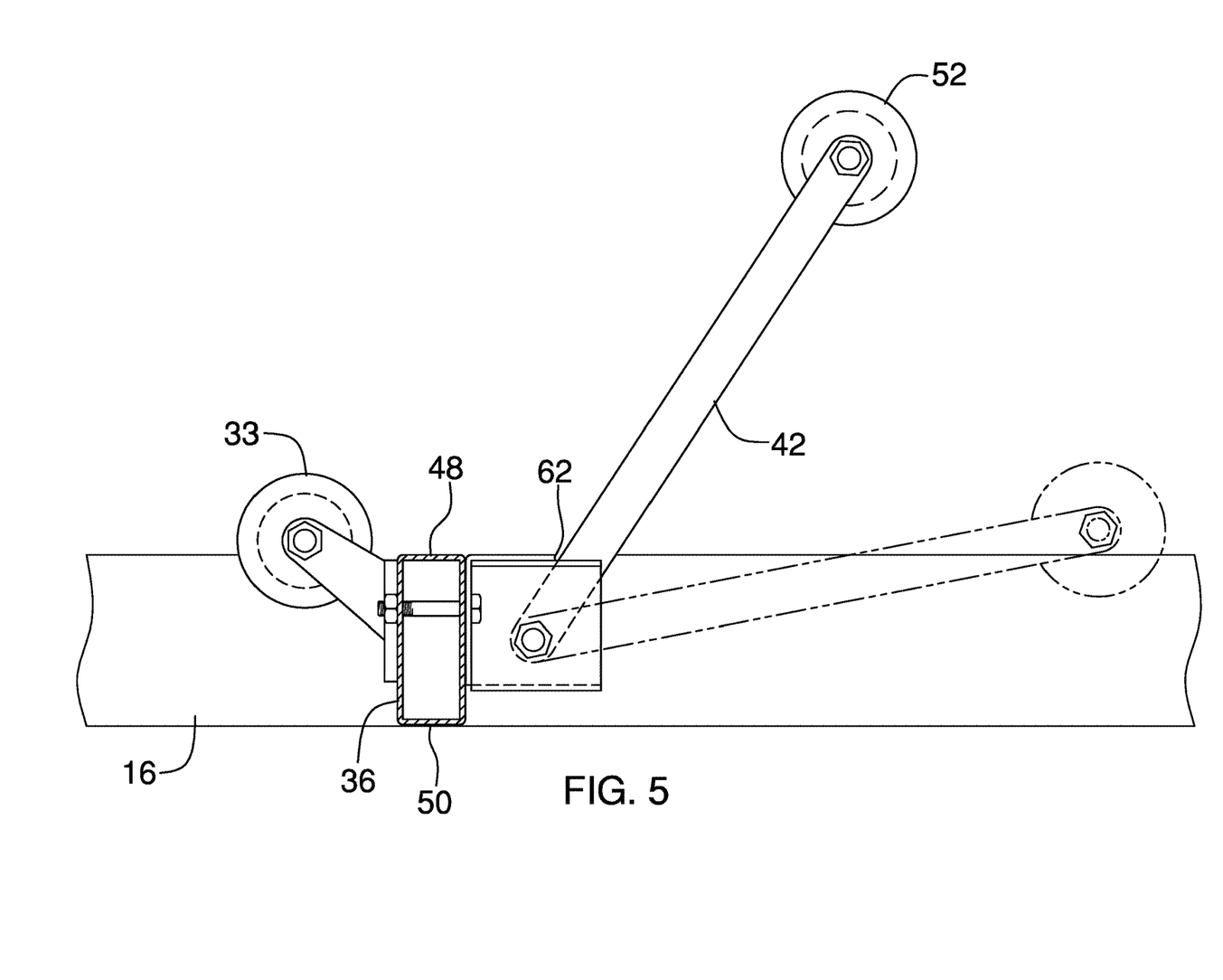
FIG. 5 is a top view of an embodiment of the disclosure.

A pair of arms 42 is provided and each has a first end 44 and a second end 46. The axle 40 extends through each of the arms 42 adjacent to the first ends 44. The arms 42 are positioned between the vertical walls 38. Relative to the trailer 12, the arms 42 only extend forwardly from the first ends 44 to the second ends 46. That is, from the mount 34, the arms 42 extend outwardly away from the rear end 22 and toward the front end 20 so that they are continuously angled forwardly as shown in FIG. 4. The arms 42 are pivotable to form an angle with respect to a top side 48 of the primary support 36 between 85° and 5°. The arms 42 remain above a bottom side 50 of side primary support 36 when the arms 42 are in an engaged position abutting a keel of a boat. This will prevent the arms 42 from striking any objects positioned below the frame 14 of the trailer 12. The arms 42 each have length generally between 10.0 inches and 16.0 inches and a distance between the arms 42 is between 6.0 inches and 15.0 inches.

A guide roller 52 extends between and is rotatably coupled to the arms 42 adjacent to the second ends 46. The guide roller 52 has a rotational axis orientated perpendicular to the longitudinal axis. A central area 54 of the guide roller 52 is aligned with central areas of the first 32 and second 33 fixed keel rollers. The central area 54 of the guide roller 52 has a smaller diameter than a pair of outer edges of the guide roller 52. Thus, the first fixed keel roller 32, the second fixed keel roller 33 and the guide roller 52 may all comprise conventionally constructed keel rollers configured for receiving a keel of a boat as the boat is moved onto and off of the trailer 12.

A biasing member 56 engages the mount 34 and the arms 42. The biasing member 56 biases the second ends 46 of the arms 42 upwardly above the top side 48 of the primary support 36 and toward a deployed position. More specifically, the biasing member 56 may include a wound spring having a first free end 58 abutting the mount 34 and a second free end 60 engaging the arms 42, either directly or on bracing extending between the arms. Alternate biasing members 56 may be utilized such as a spring attached to the mount 34 or primary brace 36 which is also attached to the arms 42 to pull the arms 42 upwardly, or a spring embedded within the axle 40 wherein the arms 42 are fixedly attached to the axle 40 and the spring urges rotation in one direction relative to the vertical walls 38.

A stop 62 is attached to the mount 34 and abuts the arms 42 when the arms 42 are in the deployed position. The stop 62 prevents an angle between the arms 42 and the top side 48 of the primary support 36 being greater than 85°. The stop 62 thereby prevents the arms 42 from over-rotating relative to the primary brace 36 so that the arms 42 are not extended rearwardly and directed toward a boat being moved onto the trailer 12.

In use, the trailer 12 is used in a generally conventional manner for transporting a boat. However, as a user of the system 10 approaches the trailer 12 in a boat, the user can align the front of the boat with the guide roller 52. Because the guide roller 52 extends upwardly from the trailer 12 when in the deployed position, as shown in FIG. 4, the boat operator can easily see the guide roller 52 and this facilitates the lining up of the boat keel with the guide roller 52 which in turn aligns the boat's keel with the first 32 and second 33 fixed keel rollers.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boat keel guide system for assisting a boat operator in properly aligning a boat with a boat trailer, said keel guide system including:

a trailer including a frame having a first member laterally offset relative to a longitudinal centerline of said trailer, a second member laterally offset relative to said longitudinal centerline of said trailer, a front end, a rear end and a plurality of supports extending between said first and second members, said trailer having a longitudinal axis extending through said front and rear ends, a first wheel being rotatably attached to said frame adjacent to said first member and a second wheel being rotatably attached to said frame adjacent to said second member, a trailer hitch being attached to said front end;

a mount being attached to a primary support of said plurality of said supports, a middle of said mount being aligned with said longitudinal axis;

an axle being attached to said mount, said axle being horizontally orientated and being orientated perpendicular to said longitudinal axis;

a pair of arms each having a first end and a second end, said axle extending through each of said arms adjacent to said first ends, said arms extending forwardly from said first ends to said second ends, said arms being pivotable to form an angle with respect to a top side of said primary support between 85° and 5°, said arms remaining above a bottom side of said primary support when said arms are in an engaged position abutting a keel of a boat;

a guide roller extending between and being rotatably coupled to said arms adjacent to said second ends, said guide roller having a rotational axis orientated perpendicular to said longitudinal axis;

a biasing member engaging said mount and said arms, said biasing member biasing said second end of said arms upwardly above said top side of said primary support and toward a deployed position; and wherein said mount includes a pair of vertical walls being laterally displaced from each other, said mount being positioned forward of said first and second wheels, said axle extending through said vertical walls.

2. The boat keel guide system according to claim 1, further including a first fixed keel roller and a second fixed keel roller, each of said first and second fixed keel rollers being rotatably coupled to said trailer and being aligned with said longitudinal axis, each of said first and second fixed keel rollers having an axis of rotation orientated perpendicular to said longitudinal axis, said first fixed keel roller being positioned rearward of said first and second wheels and said second fixed roller being positioned forward of said first and second wheels.

3. The boat keel guide system according to claim 1, wherein said arms are positioned between said vertical walls.

4. The boat keel guide system according to claim 1, wherein a central area of said guide roller has a smaller diameter than a pair of outer edges of said guide roller.

5. The boat keel guide system according to claim 1, further including a stop being attached to said mount and abutting said arms when said arms are in said deployed position.

6. The boat keel guide system according to claim 5, wherein said stop prevents an angle between said arms and said top side of said primary support being greater than 85°.

7. A boat keel guide system for assisting a boat operator in properly aligning a boat with a boat trailer, said keel guide system including:

a trailer including a frame having a first member laterally offset relative to a longitudinal centerline of said trailer, a second member laterally offset relative to said longitudinal centerline of said trailer, a front end, a rear end and a plurality of supports extending between said first and second members, said trailer having a longitudinal axis extending through said front and rear ends, a first wheel being rotatably attached to said frame adjacent to said first member and a second wheel being rotatably attached to said frame adjacent to said second member, a trailer hitch being attached to said front end;

a mount being attached to a primary support of said plurality of supports, a middle of said mount being aligned with said longitudinal axis;

an axle being attached to said mount, said axle being horizontally orientated and being orientated perpendicular to said longitudinal axis;

a pair of arms each having a first end and a second end, said axle extending through each of said arms adjacent to said first ends, said arms extending forwardly from said first ends to said second ends, said arms being pivotable to form an angle with respect to a top side of said primary support between 85° and 5°, said arms remaining above a bottom side of said primary support when said arms are in an engaged position abutting a keel of a boat;

a guide roller extending between and being rotatably coupled to said arms adjacent to said second ends, said guide roller having a rotational axis orientated perpendicular to said longitudinal axis;

a biasing member engaging said mount and said arms, said biasing member biasing said second end of said arms upwardly above said top side of said primary support and toward a deployed position;

a first fixed keel roller and a second fixed keel roller, each of said first and second fixed keel rollers being rotatably coupled to said trailer and being aligned with said longitudinal axis, each of said first and second fixed keel rollers having an axis of rotation orientated perpendicular to said longitudinal axis, said first fixed keel roller being positioned rearward of said first and second wheels and said second fixed roller being positioned forward of said first and second wheels; and wherein said mount is positioned forward of said first and second keel rollers, said guide roller being aligned with said first and second keel rollers.

8. A boat keel guide system for assisting a boat operator in properly aligning a boat with a boat trailer, said keel guide system including:

a trailer including a frame having a first member laterally offset relative to a longitudinal centerline of said trailer, a second member laterally offset relative to said longitudinal centerline of said trailer, a front end, a rear end and a plurality of supports extending between said first and second members, said trailer having a longitudinal axis extending through said front and rear ends, a first wheel being rotatably attached to said frame adjacent to said first member and a second wheel being rotatably attached to said frame adjacent to said second member, a trailer hitch being attached to said front end;

a first fixed keel roller and a second fixed keel roller, each of said first and second fixed keel rollers being rotatably coupled to said trailer and being aligned with said longitudinal axis, each of said first and second fixed keel rollers having an axis of rotation orientated perpendicular to said longitudinal axis, said first fixed keel roller being positioned rearward of said first and second wheels and said second fixed roller being positioned forward of said first and second wheels;

a mount being attached to a primary support of said plurality of said supports, a middle of said mount being aligned with said longitudinal axis, said mount including a pair of vertical walls being laterally displaced from each other, said mount being positioned forward of said first and second wheels, said mount being positioned forward of said first and second fixed keel rollers;

an axle being attached to said mount, said axle being horizontally orientated and being orientated perpendicular to said longitudinal axis, said axle extending through said vertical walls;

a pair of arms each having a first end and a second end, said axle extending through each of said arms adjacent to said first ends, said arms being positioned between said vertical walls, said arms extending forwardly from said first ends to said second ends, said arms being pivotable to form an angle with respect to a top side of said primary support between 85° and 5°, said arms remaining above a bottom side of said primary support when said arms are in an engaged position abutting a keel of a boat;

a guide roller extending between and being rotatably coupled to said arms adjacent to said second ends, said guide roller having a rotational axis orientated perpendicular to said longitudinal axis, a central area of said guide roller being aligned with central areas of said first and second fixed keel rollers, said central area of said guide roller having a smaller diameter than a pair of outer edges of said guide roller;

a biasing member engaging said mount and said arms, said biasing member biasing said second end of said arms upwardly above said top side of said primary support and toward a deployed position; and a stop being attached to said mount and abutting said arms when said arms are in said deployed position, said stop preventing an angle between said arms and said top side of said primary support being greater than 85°.

* * * * *